(12) United States Patent
Celiker et al.

(10) Patent No.: US 9,650,259 B2
(45) Date of Patent: May 16, 2017

(54) PHOTOCATALYTIC NANOCOMPOSITE MATERIAL

(75) Inventors: Gulsen Celiker, Izmir (TR); Hilmi Volkan Demir, Ankara (TR); Fatih Ozkadi, Istanbul (TR); Sameyra Tek, Ankara (TR); Evren Mutlugun, Ankara (TR); Ibrahim Murat Soganci, Ankara (TR); Tuncay Ozel, Ankara (TR); Ilkem Ozge Huyal, Ankara (TR)

(73) Assignee: ARCELIK ANONIM SIRKETI, Istanbul (TR)

( * ) Notice: Subject to any disclaimer, the term of this patent is extended or adjusted under 35 U.S.C. 154(b) by 1297 days.

(21) Appl. No.: 12/990,779

(22) PCT Filed: Apr. 22, 2009
(Under 37 CFR 1.47)

(86) PCT No.: PCT/EP2009/054847
§ 371 (c)(1),
(2), (4) Date: Aug. 5, 2011

(87) PCT Pub. No.: WO2009/133010
PCT Pub. Date: Nov. 5, 2009

(65) Prior Publication Data
US 2012/0122668 A1 May 17, 2012

(30) Foreign Application Priority Data
May 2, 2008 (TR) .............. a 2008/03064

(51) Int. Cl.
| | | |
|---|---|---|
| *C01G 23/047* | (2006.01) | |
| *B01J 21/06* | (2006.01) | |
| *B01J 35/00* | (2006.01) | |
| *B01J 37/02* | (2006.01) | |
| *C09C 1/36* | (2006.01) | |
| *B82Y 30/00* | (2011.01) | |
| *B01J 37/03* | (2006.01) | |

(52) U.S. Cl.
CPC .......... *C01G 23/047* (2013.01); *B01J 21/063* (2013.01); *B01J 35/004* (2013.01); *B01J 35/0013* (2013.01); *B01J 37/0215* (2013.01); *B01J 37/036* (2013.01); *B82Y 30/00* (2013.01); *C09C 1/3684* (2013.01); *C01P 2004/64* (2013.01); *C01P 2006/60* (2013.01)

(58) Field of Classification Search
CPC ... C01G 23/047; B01J 21/063; B01J 35/0013; B01J 35/004; B01J 37/0215; B01J 37/036; C09C 1/3684; B82Y 30/00; C01P 2004/64; C01P 2006/60
See application file for complete search history.

(56) References Cited

U.S. PATENT DOCUMENTS

| | | | | |
|---|---|---|---|---|
| 2001/0006933 | A1* | 7/2001 | Nagasaki et al. | ............. 502/239 |
| 2002/0068795 | A1* | 6/2002 | Won | ......................... C08F 8/42 |
| | | | | 525/100 |
| 2006/0096926 | A1* | 5/2006 | Mazyck | ................ B01D 15/00 |
| | | | | 210/663 |

FOREIGN PATENT DOCUMENTS

WO    WO 2008007232 A    1/2008

OTHER PUBLICATIONS

Ohno et al("Morphology of a TiO2 Photocatalyst (Degussa, P-25) Consisting of Anatase and Rutile Crystalline Phases", Journal of Catalysis (2001), 203, 82-86).*
Yan et al("Preparation of Controllable Crystalline Titania and Study on the Photocatalytic Properties," J. Phys. Chem. B. (2005), 109, 8673-8678).*
Li et al(Synthesis and Characterization of Nano titania Particles Embedded in Mesoporous Silica with Both High Photocatalytic Activity and Adsorption Capability, J. Phys. Chem. B 2005, 109, 12309-12315).*
Morris et al(Silica Sol as a Nanoglue: Flexible Synthesis of Composite Aerogel, Science vol. 284 (1999), pp. 622-624).*
Kwon et al(Preparation and Characterization of TiO2-SiO2 nanocomposite thin films, Ceramics International 29 (2003) 851-856).*
International Search Report, mailing date Oct. 27, 2009, for corresponding International Application No. PCT/EP2009/054847.

\* cited by examiner

*Primary Examiner* — Melvin C Mayes
*Assistant Examiner* — Michael Forrest
(74) *Attorney, Agent, or Firm* — Kilpatrick Townsend & Stockton LLP

(57) ABSTRACT

The present invention relates to a photocatalytic nanocomposite material, wherein the realization of the optimal wavelength for optical activation is controlled and accordingly is designed to work together with a LED operating at the wavelength for yielding the maximum efficiency.

11 Claims, No Drawings

PHOTOCATALYTIC NANOCOMPOSITE MATERIAL

CROSS-REFERENCE TO RELATED APPLICATIONS

This application is a U.S. National Phase application, under 35 U.S.C. §371, of International Application no. PCT/EP2009/054847, with an international filing date of Apr. 22, 2009 and claims benefit of Turkish Application no. A 2008/03064 filed on May 2, 2008, and which are hereby incorporated by reference for all purposes.

The present invention relates to a photocatalytic nanocomposite material whereof the light absorption effectiveness is improved.

When the "valence" electrons in the outermost orbits of the molecules forming the photocatalytic material are subjected to light, they jump up to the "conduction" band depending on the amount of absorbed energy and become free. Free hydroxyl radicals OH— are produced as a result of these electrons bonding with the $H_2O$ molecules around the photocatalytic material. $CO_2$ and $H_2O$ are produced as a consequence of these radicals bonding with organic harmful substances. Photocatalytic materials are used in decontamination of water, decontamination of harmful gases in air, and in cleansing surfaces by removal of bacteria.

Titanium dioxide ($TiO_2$), which is relatively inexpensive and chemically stable, is the most widely used photocatalytic material nowadays. Preferably, Titanium dioxide ($TiO_2$) having rutile or anatase type crystal structure is used as the photocatalytic material. Both of the crystal types absorb light only in the ultraviolet wavelength. The activation energy of rutile type Titanium dioxide ($TiO_2$) is 3.0 eV, and the activation energy of anatase type Titanium dioxide ($TiO_2$) is 3.2 eV. In other words, Titanium dioxide ($TiO_2$) of rutile crystal structure absorbs light of 413 nm or shorter wavelength and the Titanium dioxide ($TiO_2$) of anatase crystal structure absorbs light of 388 nm or shorter wavelength. Titanium dioxide ($TiO_2$) of anatase crystal structure is better suited to be used as a photocatalytic material. One of the reasons for this is the "conduction" band position of Titanium dioxide ($TiO_2$) of anatase crystal structure.

The photocatalytic effectiveness of Titanium dioxide ($TiO_2$) changes proportionately depending on the crystal type, size and the wavelength of light acting thereon. In the state of the art, various mixtures are developed for increasing the photocatalytic effectiveness of Titanium dioxide ($TiO_2$).

In the state of the art the article titled "Photodegradation of dye pollutants on silica gel supported $TiO_2$ particles under visible light irradiation" (Yingxu Chen, Kan Wang and Liping Lou, "Journal of Photochemistry and Photobiology A: Chemistry", Issue 163, No 1-2, 15 Apr. 2004, pages 281-287), how the photocatalytic effectiveness of Titanium dioxide ($TiO_2$) increases when mixed into silica gel is explained.

In the state of the art the article titled "Titanium-Oxide Photocatalyst" (www.threebond.co.jp/en/technical/technicalnews/pdf/tech62.pdf web page, ThreeBond Technical News, Issue 62, 1 Jan. 2004), the explanation is given for the increased photocatalytic effectiveness of Titanium dioxide ($TiO_2$) when mixed with silver.

The aim of the present invention is the realization of a photocatalytic nanocomposite material with improved light absorption effectiveness.

The photocatalytic nanocomposite material realized in order to attain the aim of the present invention is explicated in the attached claims.

The photocatalytic nanocomposite material of the present invention is formed as a compound of titanium dioxide ($TiO_2$) and an inorganic host. Titanium dioxide is composed of a mixture of anatase type and rutile type crystal structured molecules.

In an embodiment of the present invention the inorganic host is silica.

By controlling the crystal structure and size of titanium dioxide and the optical absorption properties of the host material, the optimal wavelength wherein the optical activation of the photocatalytic nanocomposite material will be realized is controlled.

Titanium dioxide is rutile type crystal around 5-30% by weight and anatase type crystal around 97-70% by weight. The particle sizes are variable between 4 nm-10 nm.

The photocatalytic nanocomposite material comprises 5-25% $TiO_2$ by weight.

In an embodiment of the present invention, the size of the anatase type Titanium dioxide particles is smaller than the size of rutile type Titanium dioxide particles.

In another embodiment of the present invention, the size of the anatase type titanium dioxide particles is equal to the size of rutile type Titanium dioxide particles.

Titanium dioxide and the inorganic host are bonded by the sol-gel method.

The photocatalytic nanocomposite material is activated by using a LED. The photocatalytic nanocomposite material is applied on the LED package or the LED chip or on the surface to be cleaned.

A photocatalytic nanocomposite material realized in order to attain the aim of the present invention is explicated in the following text.

The photocatalytic nanocomposite material is formed of a covalent bonded compound of titanium dioxide ($TiO_2$) and an inorganic host. Titanium dioxide and metal alkoxides are bonded by sol-gel method to form a nano structured organic film containing three dimensional nano metals.

Titanium dioxide is composed of the mixture of anatase crystal structure type molecules and rutile crystal structure type molecules. The rutile type Titanium dioxide crystals increase the absorption rate of light in the ultraviolet wavelength. The absorbed photons interact with anatase type Titanium dioxide crystals maintaining the increase in photocatalytic performance. The rutile type crystal structured Titanium dioxide absorbs the UV light required for photocatalytic reaction and increases the effectiveness and number of photocatalytic reactions on the surface of anatase type Titanium dioxide. Titanium dioxide preferably comprises 5%-30% of rutile type crystals by weight and 95%-70% of anatase type crystals by weight.

The photocatalytic nanocomposite material basically comprises 5%-25% Titanium dioxide by weight and 95%-75% inorganic host by weight.

The inorganic host surrounds the titanium dioxide crystals by forming a thin crust around them. The inorganic host maintains the titanium dioxide crystals to be positioned in a mono dispersed and homogeneous formation. Accordingly, the titanium dioxide crystals are maintained to stay mono dispersed by preventing from the decomposition of their mutual arrangement and clustering when subjected to high temperatures during application of the photocatalytic nanocomposite material on a surface.

The inorganic host is preferably silica ($SiO_2$). The molecules derived from partial hydrolysis of silanes $Si(OH)_4$ and the nanosized titanium dioxide particles are used in the compound. The energy efficiency of the photocatalytic nanocomposite material is increased since silica absorbs relatively lesser amount of light in the ultraviolet wavelength.

A rough surface morphology is attained by using together the rutile and anatase type crystal structured titanium dioxide molecules. The UV light and the contact surface of the semiconductor metals are increased due to the micro-sized roughness of the surface and the nanostructured porosity of the nanocomposite film. The heterogeneous surface structure maintained by the rutile type and anatase type titanium dioxide crystals of variable sizes increase effectiveness. The size of the anatase type crystal is 3 times larger than the rutile type crystal.

The silica that is used as the inorganic host aids in forming a hydrophobic layer on the outer surface of the photocatalytic nanocomposite material. Consequently, foreign particles cannot easily cohere on the outer surface when light does not act on the photocatalytic nanocomposite material. When light acts on the photocatalytic nanocomposite material, the surface exhibits hydrophilic characteristics and maintains the organic impurities that will be eliminated by free hydroxyl radicals to be held thus increasing the cleaning performance of the photocatalytic nanocomposite material.

Titanium dioxide is composed of nanosized particles, preferably sizes of 4 nm-10 nm are used. The particles of quantum sizes (below 10 nm) form a higher energy gap under UV light than nanoparticles of other sizes. The photocatalytic cleaning effectiveness has the highest value due to the high energy gap and a greater surface area in these sizes. For example, the surface area of a 6 nm sized particle is 6 times more than 20 nm sized particles. As the particle size is reduced, the surface area of the photocatalytic nanocomposite material and hence the photocatalytic effect is increased. For this reason, the particle size of anatase type crystal structured titanium dioxide is more effective on photocatalytic performance than the particle size of rutile type crystal structured titanium dioxide.

Sol-gel is derived by adding the rutile type crystal structured and anatase type crystal structured titanium dioxide to partially hydrolyzed compounds and by the condensation process. In order to form uniform films during condensation (polymerization) acrylic, epoxy or acrylate modifications can be made. Condensation takes place in an acidic environment at temperatures of 65-85° C. The inorganic based nanocomposite film is formed by coating with the sol-gel procured as a result of the process. The homogeneous dispersion of rutile type and anatase type crystals forming titanium dioxide in the derived inorganic net is maintained by the sol-gel process. The sulfate amount in the titanium dioxide structure left from the production process is preferred to be less than 0.2%. The photocatalytic effectiveness is reduced as the amount of sulfate on metal crystals increases.

The colloidal suspension (photocatalytic nanocomposite material) that is formed by covalent bonding of titanium dioxide crystals with the inorganic host, is coated on the desired surface, for example on glass, at room temperature by dip coating or spin coating methods. Accordingly, the structure, type and rate of anatase and rutile crystals can be preserved. The derived coating is cured at 130-150 degrees centigrade for 30-60 minutes.

In an embodiment of the present invention, the particle size of anatase type crystal structured titanium dioxide is smaller than the particle size of rutile type crystal structured titanium dioxide. This embodiment is preferred since the particle size of anatase type crystal structured titanium dioxide in the mixture is more effective on photocatalytic performance than the particle size of rutile type crystal structured titanium dioxide.

In another embodiment of the present invention, the particle size of anatase type crystal structured titanium dioxide is equal to the particle size of rutile type crystal structured titanium dioxide. For example, the both types of particle sizes are 6 nm.

The photocatalytic nanocomposite material is activated by using a LED (light emitting diode) as the light source. The photocatalytic nanocomposite material is coated on the surface to be cleaned, on the LED package or on the LED chip.

The wavelength of the LED used is ascertained according to determined optimum values with respect to the particle sizes and crystal structures of titanium dioxide in the photocatalytic nanocomposite material. The LED of the present invention is produced from Gallium nitride (GaN) or Indium gallium nitride (InGaN).

In an embodiment of the present invention, the rate of nanosized titanium dioxide with a particle size of 6 nm in the photocatalytic nanocomposite material is 15% by weight. Titanium dioxide is 80% anatase type crystal structure by weight and 20% rutile type crystal structure by weight. The photocatalytic nanocomposite material is activated by light (e.g. LED) of 310-330 nm wavelength. The activation of the said mixture starts at 380 nm but the maximum yield is produced at the light of 310-330 nm wavelengths.

In another embodiment of the present invention, titanium dioxide and the inorganic host are combined by the aero-gel method. The porosity and hence the surface area of the transparent film thus derived are increased.

By means of the photocatalytic nanocomposite material of the present invention, the optimal wavelength wherein optical activation will be realized is controlled. Accordingly, the photocatalytic nanocomposite material is designed to work together with a LED operating at the wavelength for yielding the maximum efficiency. The surface morphology of the photocatalytic nanocomposite material is determined by controlling the crystal structure and size of titanium dioxide and the optical absorption features of the host material.

The invention claimed is:

1. A photocatalytic nanocomposite material comprising titanium dioxide ($TiO_2$) is composed of anatase type crystal structure molecules and rutile type crystal structure molecules and an inorganic host forming a crust around the titanium dioxide wherein the inorganic host surrounding the titanium dioxide prevents decomposition and clustering of the titanium dioxide and maintains the titanium dioxide crystals in a monodisperse and homogenous formation, the titanium dioxide particle having sizes between 4 and 10 nm.

2. The photocatalytic nanocomposite material as in claim 1, the titanium dioxide comprising around 5%-30% of rutile type crystal molecules by weight and around 95%-70% anatase type crystal molecules by weight.

3. The photocatalytic nanocomposite material as in claim 2, basically comprising 5%-25% titanium dioxide by weight.

4. The photocatalytic nanocomposite material as in claim 2, wherein the titanium dioxide is 80% of anatase type, 20% of rutile type and wherein the titanium dioxide is 15% by weight of the photocatalytic nanocomposite material.

5. The photocatalytic nanocomposite material as in claim 1, wherein the titanium dioxide is composed of particles sized 6 nm.

6. The photocatalytic nanocomposite material as claim 1, comprising silica ($SiO_2$) as the inorganic host.

7. The photocatalytic nanocomposite material as in claim 1, comprising bonding together the titanium dioxide and the inorganic host by a sol-gel method.

8. The photocatalytic nanocomposite material as in claim 1, being activated using a LED as a light source and coating the material on a package of the LED.

9. The photocatalytic nanocomposite material as in claim 8, being activated with light in a 320-330 nm wavelength.

10. The photocatalytic nanocomposite material as in claim 1, being activated using a LED as a light source and coating the material on the chip of the LED.

11. The photocatalytic nanocomposite material as claim 10, being activated with light in a 320-330 nm wavelength.

* * * * *